United States Patent [19]
Di Simone

[11] 3,873,465
[45] Mar. 25, 1975

[54] PHOSPHO-ESTER COMPOSITION FOR SCALE AND CORROSION INHIBITION
[75] Inventor: Ignazio Sergio Di Simone, Rome, Italy
[73] Assignee: Nalco Chemical Company, Chicago, Ill.
[22] Filed: Feb. 15, 1973
[21] Appl. No.: 332,968

[52] U.S. Cl............... 252/181, 252/87, 252/389 A, 21/2.7 A, 210/58
[51] Int. Cl............................................ C02b 1/00
[58] Field of Search............... 252/181, 389 A, 87; 21/2.7 A; 210/58

[56] References Cited
UNITED STATES PATENTS
2,890,175   6/1959   Kipps................................. 252/181
2,934,503   4/1960   Chittum et al...................... 252/181
3,487,018   12/1969  Troscinski.......................... 252/181

Primary Examiner—Stephen J. Lechert, Jr.
Attorney, Agent, or Firm—John G. Premo; Robert A. Miller

[57] ABSTRACT

A phospho-ester scale and corrosion inhibition composition for alkaline-side cooling water treatment. The composition is characterized as having a low orthophosphate content and high zinc stabilization properties.

9 Claims, No Drawings

PHOSPHO-ESTER COMPOSITION FOR SCALE AND CORROSION INHIBITION

INTRODUCTION

It is known in the art to prepare organic phosphate esters by reacting polyphosphoric acid or phosphorus pentoxide or mixtures thereof with hydroxy hydrocarbons and/or hydroxy amines as disclosed, for example, in U.S. Pat. Nos. 3,462,365; 3,477,956 and 3,502,587. The resultant compositions have been found to be useful as scale inhibitors when added to water containing hardness components such as, for example, barium sulfate, calcium sulfate, and calcium carbonate. While these organic phosphate esters are effective scale inhibitors when added to scale forming waters in hardness precipitation-preventing quantities of the order of 0.5 to 100 ppm of the active effective compound; their effectiveness is reduced in certain calcium-containing waters due to the fact that ortho-phosphates are one of the reaction products. It has been determined that the ortho-phosphate compounds reduce the overall effectiveness of corrosion inhibition due to its reaction with calcium to form calcium ortho-phosphate, thereby producing a scale rather than preventing scale formation.

More specifically, the product formed by phosphorating triethanol amine with polyphosphoric acid results in a product which contains up to greater than 12 to 13 percent by weight of ortho-phosphate. It would certainly be an advancement in the art to provide a phospho-ester scale inhibition composition which has a lesser ortho-phosphate content.

In addition, the compositions taught by the prior art are not stabilizing with zinc and therefore zinc, if added, precipitates without providing corrosion inhibition effect. So it would be also desirable to provide a phospho-ester scale inhibition composition to which zinc could be added to provide a composition which exhibits improved scale and corrosion inhibition properties.

OBJECTS

It is therefore an object of this invention to provide a phospho-ester scale inhibition composition which has a low ortho-phosphate content.

Another object of this invention is to provide a phospho-ester scale inhibition composition which has improved high zinc stabilization properties.

A further object of this invention is to provide a phospho-ester scale inhibition composition which when combined with zince has improved scale and corrosion inhibition properties.

A still further object of this invention is to provide a method for cooling water treatment using phospho-esters plus zinc salts. This composition has a low ortho-phosphate content and a high zinc stabilization, therefore shows good corrosion and scale protection in cooling water treatment.

Further objects will appear hereinafter.

THE INVENTION

This invention teaches an improved phospho-ester scale and corrosion inhibition composition which can be used in cooling towers without pH control. The pH of such systems naturally tends to go up, toward alkalinity, so is typically greater than 7.0. This is oftentimes referred to as alkaline-side cooling water treatment. The phospho-ester scale and corrosion inhibition composition of this invention is characterized as having a low ortho-phosphate content and a high zinc stabilization. The product of this invention is formed by the following steps:

A. Heating an alkanol amine with an organic mixture to 75° to 85°C. with mixing, the organic mixture comprised of a polyhydroxy compound, ethylene glycol and a monoether of ethylene glycol wherein the ratio of alkanol amine to organic mixture is 60:40 to 40:60;

B. Adding from 150 to 300 percent by weight based on the amine of phosphorous pentoxide to the composition formed in step (A) over a period of 4 to 8 hours and increasing the reaction temperature at a constant rate to 120°C. over said time period;

C. Increasing the temperature of the composition formed in step (B) to 130° to 140°C. in ½ to 2 hours;

D. Heating the composition formed in step (C) at 140°C. for 1 hour;

E. Adding a monoether of ethylene glycol to the composition formed in step (D) and heating at 135° to 140°C. for ½ to 2 hours; and F. Filtering and recovering the phospho-ester product.

The preparation of the phospho-ester scale inhibition composition of this invention involves heating alkanol amine and an organic mixture as described in step (A). The organic mixture has three components, including a polyhydroxy compound, ethylene glycol and a monoether of ethylene glycol.

The alkanol amines useful in this invention may vary over a wide range. Typically, the mono-, di- and tri-alkyl amines having from 1 to 5 carbon atoms are most useful. More specifically, the preferred amines are triethanol amine, diethanol amine and monoethanol amine. Also useful are the mono-, di- and tri- methanol and propanol amines.

Typically, any polyhydroxy compound would be useful in the practice of this invention. Examples of polyhydroxy compounds which can be employed in this invention are: oxyethylated glycerin containing 1.5 to 2.5 moles of ethylene oxide per mole of glycerin; ethoxylated mannitol made with 2 to 20 moles of ethylene oxide per mole of mannitol; ethoxylated sorbitol prepared by reacting 2 to 20 moles of ethylene oxide per mole of sorbitol; ethoxylated trimethylol propane made with 1.5 to 2.5 moles of ethylene oxide per mole of trimethylol propane; hydroxy hydrocarbons made by reacting other alkylene oxides, e.g., 1,2-propylene oxide and/or 1,2-butylene oxide or mixtures of these with ethylene oxide, or sequential addition of 1,2-propylene oxide and ethylene oxide in that order with polyhydroxy hydrocarbons. These and many other polyhydroxy compounds are well known in the art. The preferred polyhydroxy compound of this invention is the ethylene oxide adduct of glycerin.

The mono-ethers of ethylene glycol which are useful in this invention are methyl cellosolve and ethyl cellosolve.

The ratio of the three components which comprise the organic mixture may vary over a wide range. A typical ratio of polyhydroxy compound-ethylene glycol-mono-ether of ethylene glycol which has been found useful in this invention is 4:1:4. The ratio of alkanol amine to organic mixture also may vary over a wide range. Typically the ratio will range from 80:20 to 20:80, preferably being in the range 60:40 to 40:60.

The alkanol amine and organic mixture is heated to 75° to 85°C. with mixing. Then from 150 to 300 percent by weight based on the amine of phosphorus pentoxide is added to this mixture. The phosphorus pentoxide is added continuously to the mixture over a period of 4 to 8 hours. The phosphorus pentoxide should be added at a constant rate. The reaction temperature is increased at a constant rate during the phosphorus pentoxide addition period. The temperature is raised from 90° to 100°C. for the first 33% $P_2O_5$ addition, between 100° to 110°C. for the second 33% $P_2O_5$ addition and 110° to 120°C. for the third 33% $P_2O_5$ addition. In other words, the temperature rise is at a uniform and constant rate of increase over the time period.

After the phosphorus pentoxide addition, the temperature of the entire mixture is raised to 130° to 140°C. over a period of ½ to 2 hours. The composition is held at a temperature of 140°C. for 1 hour. After the dual-step temperature increase an additional monoether of ethylene glycol is added to the mixture and heated at 130° to 140°C. for ½ to 2 hours. The monoether of ethylene glycol is added in a concentration of approximately 5 to 15 percent by weight of the reaction mixture.

Finally, additional water and/or alkali metal hydroxide may be added to the reaction mixture in a concentration of approximately 5 to 15 percent by weight of the mixture after which the product is filtered and recovered.

The product formed by the procedure of this invention provides a phospho-ester composition having a maximum ortho-phosphate component 5 to 6 percent. The composition of this invention is further illustrated by the following examples.

Typically, zinc is added to the phospho-ester composition as a water-soluble zinc salt. Salts useful in the practice of this invention are zinc chloride, zinc sulfate and zinc nitrate. The salt is present in a concentration of from 5 to 30 percent by weight, based on phospho-ester.

EXAMPLE 1

In a clean dry vessel the following reactants were charged:
- 18.78 grams of triethanol amine
- 8.39 grams ethyl cellosolve
- 8.22 grams of an ethylene oxide adduct of glycerin (2.0 moles ethylene oxide per mole glycerin)
- 2.52 grams ethylene glycol The mixture is heated to 80°C. with mixing to form a homogeneous mass. Mixing is continued as 25 grams $P_2O_5$ is added according to the following rate schedule:
- 25 percent during first hour
- 20 percent during second hour
- 15 percent during third hour
- 15 percent during fourth hour
- 15 percent fifth hour
- 10 percent during sixth hour Total time of addition: 6 hours.

The temperature of the reaction was increased during the $P_2O_5$ addition. The temperature was raised to between 90° to 110°C. for the first ⅓ $P_2O_5$ addition, between 100° and 110°C. for the second ⅓ $P_2O_5$ addition and 110° to 120°C. for the third $P_2O_5$ addition.

After the addition of the $P_2O_5$ the temperature was increased from 130° to 135°C. over a one hour period. The temperature was then raised to 140°C. and held at this temperature for 1 hour. A slow viscosity decrease was observed during this time period. Then 6.71 grams of ethyl cellosolve was added and allowed to react for 1 hour at 135° to 140°C. After the reaction was completed the ortho-phosphate content was measured and found to be 5.75 percent.

At this time 12.59 grams of soft water and 12.59 grams of a 50 percent sodium hydroxide solution were added to the reaction mixture; then the product was filtered and recovered. The ortho-phosphate content measured in the final product was 4.375 percent.

ZINC STABILIZATION TESTS

Zinc stabilization tests involve the determination of the amount of zinc ions that are in a water solution of the composition of this invention, namely the phosphoester plus zinc scale and corrosion inhibition composition. As mentioned above, the zinc is added to the phospho-ester composition as a water-soluble zinc salt. In order to determine the amount of zinc ions in solution a laboratory test was devised. This test involves the recirculation of synthetic water added with the composition of this invention through a recirculator pump for a period of 20 hours. After the 20 hour period the amount of dissolved zinc ions in solution is measured. The amount of zinc ions in solution can be measured by any standard test. The particular method used in the examples below was ASTM No. D1691-67.

The synthetic water used in the zinc stabilization test had approximately the following composition:

| | |
|---|---|
| Total Hardness ($CaCO_3$) | 1230 |
| Calcium Hardness ($CaCO_3$) | 1100 |
| Magnesium Hardness ($CaCO_3$) | |
| Chlorides (NaCl) | 1391 |
| M Alkalinity | 310 |
| pH | 7.3–8.5 |

Each test involved the addition of 50 ppm of the corrosion inhibitor. The temperature of the water was kept at 30°C. throughout the test. The amount of zinc added to each test is shown in Table I below. The zinc content percentage was based on the amount of scale inhibitor added to the test water.

TABLE I

| Test No. | Zinc % as ($ZnSO_4$) | Scale Inhibitor | Alkalinity | % Zinc Stabilization |
|---|---|---|---|---|
| 1 | 13.8 | Ex 1 | 425 | 69.5 |
| 2 | 14.1 | Ex 1 | 310 | 60.0 |
| 3 | 13.8 | Ex 1 | 480 | 62.0 |

To measure the scale and corrosion inhibition properties of the composition of this invention the following test was performed. The test consists of a water reservoir, a test vessel, a heat transfer tube, clear plastic blocks for holding coupons and a cooling condenser. Water is pumped from the test vessel through the system. Make-up water is automatically added from the reservoir to the system. An aerator keeps the water saturated with air, simulating the conditions in most open cooling tower basins. All parts of the system other than the heat transfer tube and corrosion coupons are made of glass, plastic or stainless steel.

Coupons and heat transfer tubes can be handled by any of the accepted procedures of preparing and cleaning metal specimens. Usually the tubes are simply solvent cleaned, dried and weighed. Both tube and coupons are inspected before the test for flaws or imperfections which might give atypical results. After tubes and coupons are installed, the test vessel and reservoir are filled with the test water containing the desired treatment.

Careful visual observations are made of the tube and coupons, and photographs are taken whenever significant changes occur. Water in the reservoir usually lasts 5 days; therefore the reservoir must be refilled twice during a 2-week test.

Coupons are removed from the blocks on the fourth day (end of the high level treatment) and the seventh day (half way point in the test). On the 14 day, the tube is photographed in place, and the test is shut down. The tube and the last coupon are removed, dried and photographed if significant deposits or corrosion are present. Then the tube and coupon are weighed, cleaned to remove all deposits and reweighed to determine amount of deposit. All coupons removed during the test are handled the same. Tubes and coupons are carefully inspected for evidence of tuberculation and pitting. Unusual deposits may be analyzed gravimetrically or by X-ray diffraction.

Analysis of data from replicate test runs has shown that the 95 percent confidence range of individual determinations of deposition on heat transfer tubes is ± 20 percent or 1 mpy, whichever is greater. On coupons, the range is ± 10 percent or 1 mpy. The larger standard error on the heat transfer tubes results from the much larger surface area involved and from the possibility of losing small amounts of deposit while removing tubes from the units.

Table II lists the test results.

TABLE II

| Test No. | M Alk | Ca ppm | NaCl ppm | Tube Deposit | $ZnSO_4$ | MPY |
|---|---|---|---|---|---|---|
| Ex 1 | 470 | 860 | 1090 | 19.0 mg | 15.0 | 1.05 |

I claim:

1. A phospho-ester scale and corrosion inhibition composition for alkaline-side cooling water treatments, said composition being characterized as having a low ortho-phosphate content and a high zinc stabilization, said phospho-ester scale and corrosion inhibition composition being formed by the following steps which comprise:

A. heating an alkanol amine with an organic mixture to 75° to 85°C. with mixing, said organic mixture comprised of a polyhydroxy compound, ethylene glycol and a mono-ether of ethylene glycol wherein the ratio of alkanol amine to organic mixture is 60:40 to 40:60;

B. adding from 150 to 300 percent by weight based on said amine of phosphorous pentoxide to the composition formed in step (A) over a period of 4 to 8 hours and incrementally increasing the reaction temperature at a constant rate to 120°C. over said time period;

C. increasing the temperature of the composition formed in step (B) to 130° to 140°C. in ½ to 2 hours;

D. heating the composition formed in step (C) at 140°C. for 1 hour;

E. adding a mono-ether of ehylene glycol to the composition formed in step (D) and heating at 135° to 140°C. for ½ to 2 hours; and F. filtering and recovering the phospho-ester product.

2. A phospho-ester scale and corrosion inhibition composition of claim 1 wherein the ratio of polyhydroxy compound to ethylene glycol to mono-ether of ethylene glycol is 4:1:4.

3. A phospho-ester scale and corrosion inhibition composition of claim 1 wherein the polyhydroxy compound is an ethylene oxide adduct of glycerin.

4. A phospho-ester scale and corrosion inhibition composition of claim 1 wherein the mono-ester of ethylene glycol is methyl cellosolve.

5. A phospho-ester scale and corrosion inhibition composition of claim 1 wherein the mono-ether of ethylene glycol is ethyl cellosolve.

6. A phospho-ester scale and corrosion inhibition composition of claim 1 which contains dispersed therein a water-soluble zinc salt in a concentration of 5 to 30 percent by weight based on phospho-ester.

7. A method for scale and corrosion inhibition for alkaline-side cooling waters by the addition of the composition of claim 1.

8. A phospho-ester scale and corrosion inhibition composition of claim 1 wherein the phosphonating agent is phosphorus pentoxide.

9. A phospho-ester scale and corrosion inhibition composition of claim 1 wherein the alkanol amine is triethanol amine.

* * * * *

UNITED STATES PATENT OFFICE
CERTIFICATE OF CORRECTION

PATENT NO. : 3,873,465
DATED : March 25, 1975
INVENTOR(S) : Ignazio Sergio Di Simone It is certified that error appears in the above–identified patent and that said Letters Patent are hereby corrected as shown below:

Column 6, Claim 4, Line 31 for "mono-ester" should read -- mono-ether --.

Signed and Sealed this second Day of September 1975

[SEAL]

Attest:

RUTH C. MASON
Attesting Officer

C. MARSHALL DANN
Commissioner of Patents and Trademarks